United States Patent [19]

Richards

[11] 4,097,961
[45] Jul. 4, 1978

[54] MOLD COVER FOR FOOD PATTY MOLDING MACHINE

[75] Inventor: Louis R. Richards, Mokena, Ill.

[73] Assignee: Formax, Inc., Mokena, Ill.

[21] Appl. No.: 733,045

[22] Filed: Oct. 18, 1976

Related U.S. Application Data

[63] Continuation-in-part of Ser. No. 623,986, Oct. 20, 1975, Pat. No. 4,054,967.

[51] Int. Cl.² ............................................. A22C 7/00
[52] U.S. Cl. .......................................... 17/32; 17/45
[58] Field of Search ................ 17/32, 45; 426/513; 100/178, 179, DIG. 10; 99/450.7

[56] References Cited

U.S. PATENT DOCUMENTS

| | | | |
|---|---|---|---|
| 2,099,638 | 11/1937 | Wiley | 17/32 |
| 2,706,830 | 4/1955 | Holly | 17/32 |
| 2,803,458 | 8/1957 | Holly | 17/32 |
| 3,479,687 | 11/1969 | Holly | 17/32 |
| 3,800,362 | 4/1974 | Wilson | 17/32 |
| 3,851,442 | 12/1974 | Miles | 17/32 |
| 3,869,757 | 3/1975 | Holly | 17/32 |
| 3,928,891 | 12/1975 | Holly | 17/32 |
| 3,964,114 | 6/1976 | Holly | 17/32 |
| 3,964,127 | 6/1976 | Holly | 17/32 |

Primary Examiner—Russell R. Kinsey
Assistant Examiner—Paul J. Hirsch
Attorney, Agent, or Firm—Kinzer, Plyer, Dorn & McEachran

[57] ABSTRACT

A mold cover covering one side of a movable mold plate slidably mounted between the mold cover and a base and connecting the mold to a food pump, comprising a thick, rigid cover plate mounted on the pump, a thinner fill plate removably mounted on the cover plate in tight surface-mating engagement with the cover plate and in sliding surface-mating engagement with the mold plate, the fill plate and the cover plate having aligned apertures affording a continuous fill passage from the pump to the mold plate, and a relief channel in one of the mating surfaces of the cover plate and the fill plate, the relief channel encompassing the fill passage but not being connected thereto, for receiving excess food product forced between the cover plate and the fill plate to thereby prevent such excess food product from deflecting the fill plate to bind against the mold plate.

10 Claims, 7 Drawing Figures

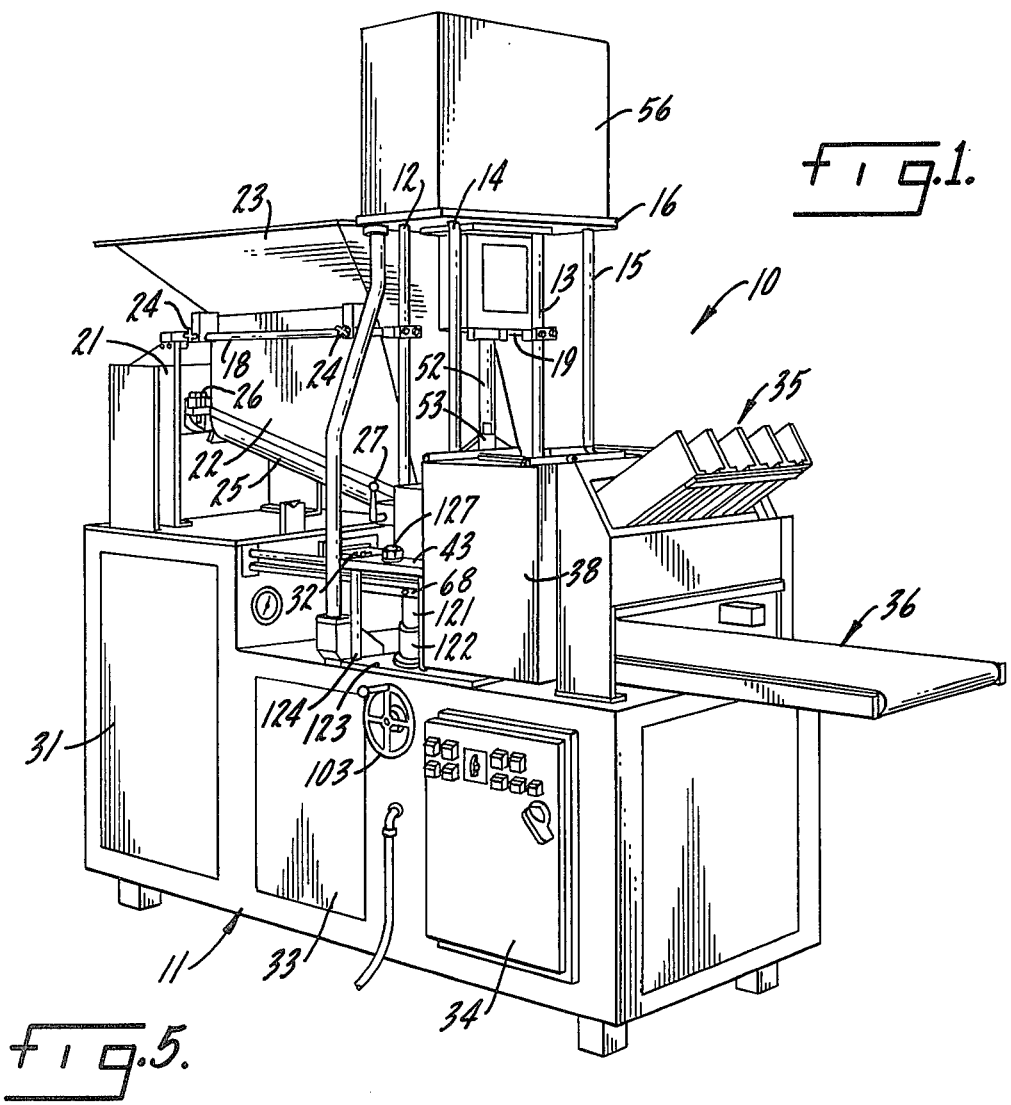
fig.1.
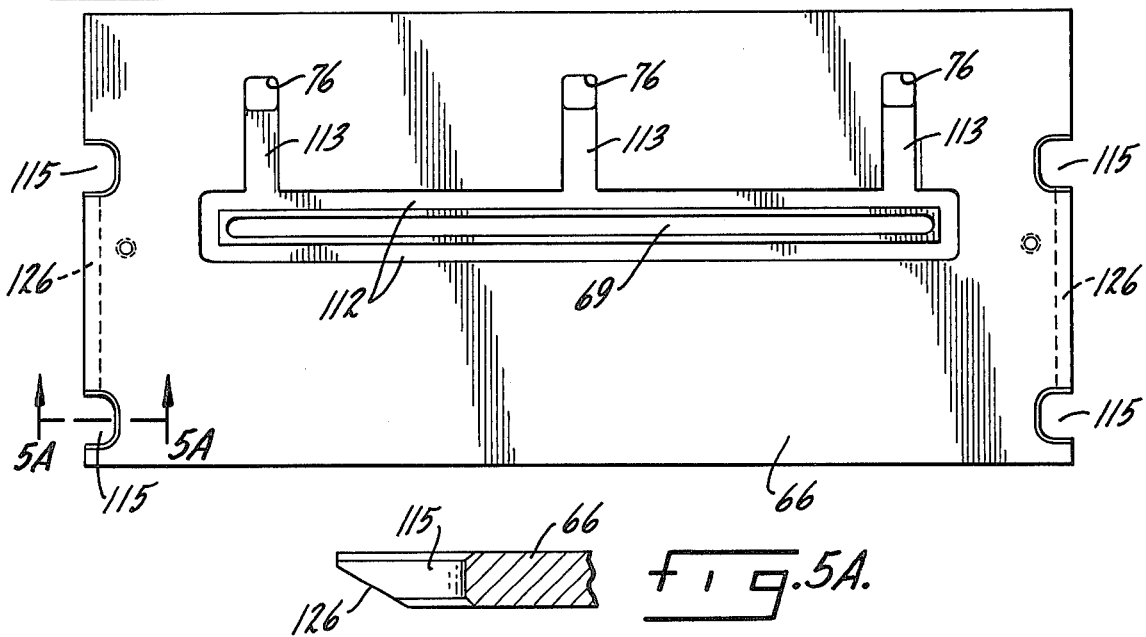
fig.5.
fig.5A.

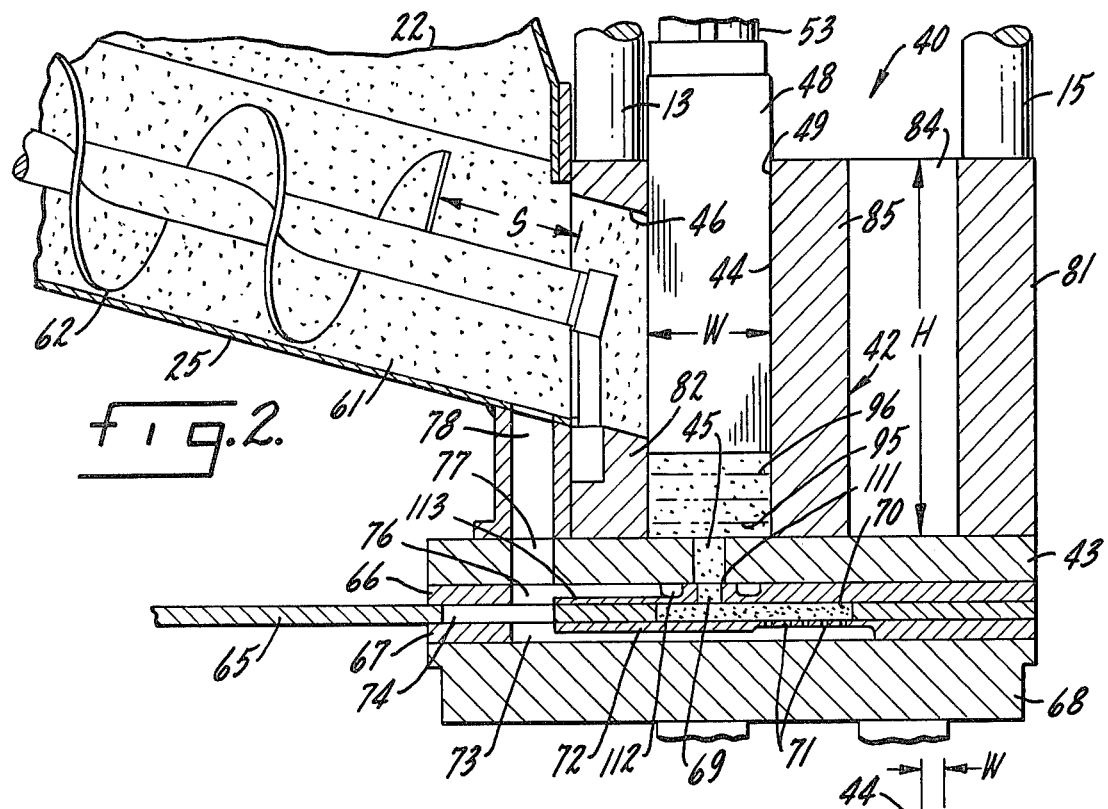
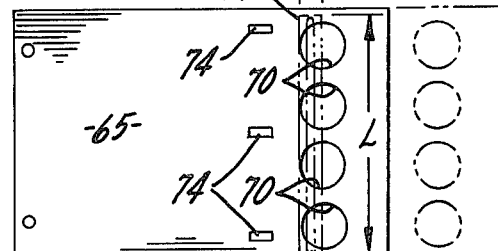
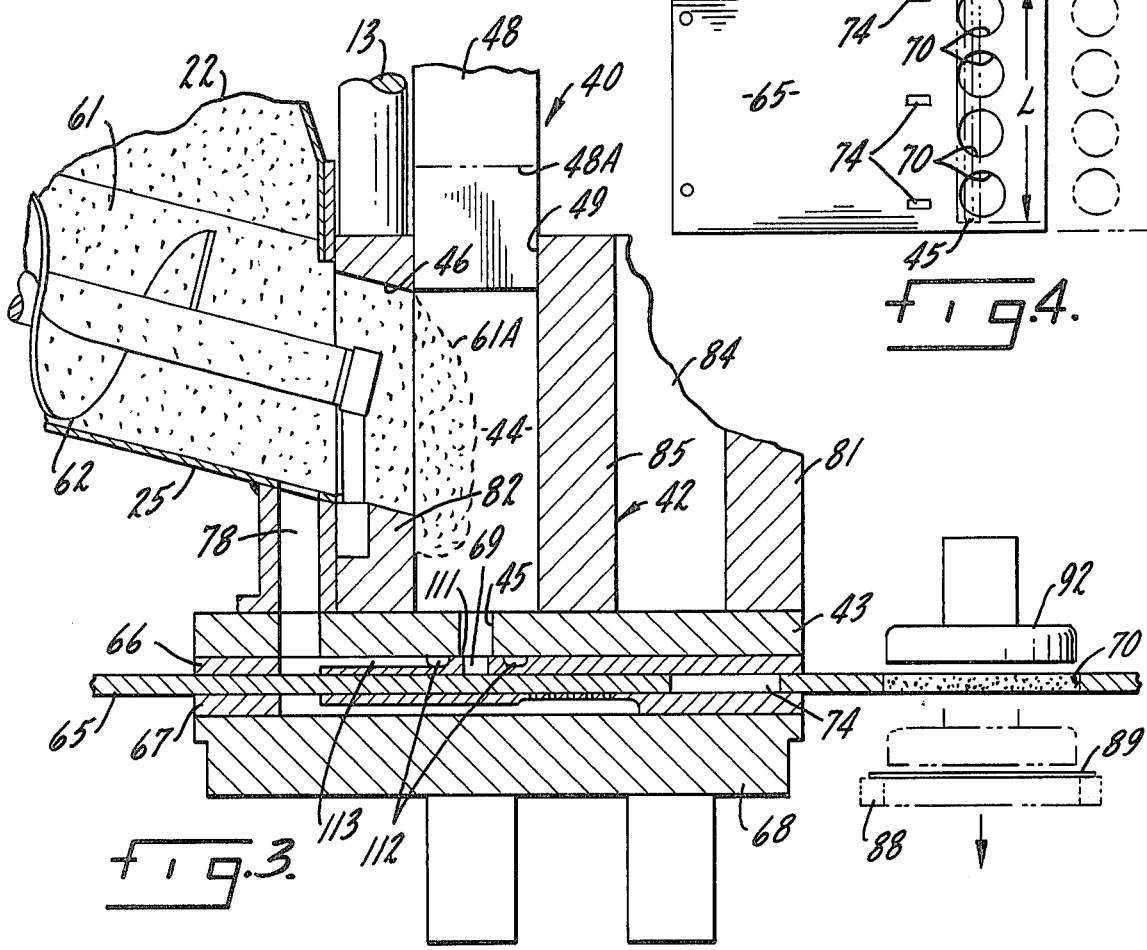

MOLD COVER FOR FOOD PATTY MOLDING MACHINE

CROSS REFERENCE TO RELATED APPLICATION

This application is directed to an improvement of the food patty molding machine disclosed in G. Sandberg et al U.S. patent application Ser. No. 623,986, filed Oct. 20, 1975 now U.S. Pat. No. 4,054,967, and comprises a continuation-in-part of that application.

BACKGROUND OF THE INVENTION

It has become common practice to manufacture food patties at a central location for distribution to restaurants, fast-food establishments, grocery stores, and other retail outlets. The most common food patties are hamburger patties molded from ground meat; other food products processed by the same techniques include fish patties, patties formed from flaked or shredded meat, and even patties formed from vegetable foods. The term "food product", as used throughout this specification and the appended claims, refers to any of the various foods identified above and to others having similar properties; the food products processed under the invention are not free-flowing, but are quite viscous and resistant to flow, and are only moderately compressible.

In molding food patties, the food product is usually fed from a hopper or similar container into a food pump which forces the food product, under substantial pressure, through a fill passage extending in a mold cover and then into a plurality of mold cavities in a mold plate. The mold plate is mounted between a base and the mold cover, and is moved in a cyclic rotary or reciprocating motion between a fill position at which it receives food product from the pump and a discharge position at which food patties are discharged from the mold cavities. Effective operation of the molding machine depends upon maintenance of smooth, close, sliding engagement between the mold plate and each of the mold base and the mold cover.

In many food patty molding machines, particularly high volume machines, the pumping pressure for the food product is relatively high. Consequently, the mold cover must be quite strong and rigid in order to achieve sufficient structural integrity to preclude distortion of the mold cover that might cause it to bind against the mold plate. An operating problem is presented if a piece of hard foreign matter passes through the machine; this can scar the surfaces of the mold cover or the mold base that engage the mold plate, with resulting subsequent distortion of the food patties or collection of food product in the scars. If the machine is used to mold patties of varying volume, for efficient operation it may be necessary to change the size of the fill passage in order to produce a well-knit patty, because the molded characteristics of the patty depend to some extent upon the velocity of the food product entering the mold cavities.

In many previously known food patty molding machines, the mold cover has constituted a single, heavy, rigid cover plate. A cover plate of this kind, which may also be an integral part of the food pump, is difficult to remove for cleaning or replacement. Furthermore, a unitary single-plate cover of this kind is usually quite expensive, so that maintenance of a plurality of cover plates adapted to varying mold cavity requirements is economically undesirable.

In the molding machine construction shown in the aforementioned Sandberg et al application, Ser. No. 623,986, the mold cover is of two-part construction, comprising a heavy rigid cover plate upon which is mounted a somewhat thinner auxiliary plate referred to herein as a fill plate, the fill plate being the element of the mold cover immediately adjacent to the mold plate. This construction makes it possible to change the portion of the cover that engages the mold plate without engendering some of the problems noted above. In particular, the mounting arrangement for the fill plate can be one which permits rapid and convenient removal and replacement of that plate, greatly facilitating a changeover from food patties of one size to those of another size. Similarly, a thinner and more readily removable fill plate, as a part of the mold cover, allows for more economical maintenance of the patty molding machine, either by resurfacing of the fill plate or by replacement, to correct for normal wear or for any scarring of the fill plate that might be occasioned by passage of hard foreign material through the machine.

This two-part construction for the mold cover, however, introduces an additional problem. The substantial pressure applied to the food product during the fill portion of the machine cycle is also applied at the point of juncture, in the fill passage, between the fill plate and the cover plate. This pressure tends to force food product between the cover plate and the fill plate; with continuing operation, an excess of food product forced between the two plates tends to deflect the fill plate toward the mold plate, eliminating the normal running clearance for the mold plate and effectively braking the mold plate. This binding or braking action between the mold plate and the fill plate creates a potential overload for the mold plate drive and also produces a marked increase in wear on the fill plate and mold plate surfaces. Both of these effects are highly undesirable and unacceptable in a high volume food patty molding machine.

SUMMARY OF THE INVENTION

It is a principal object of the present invention, therefore, to provide a new and improved mold cover construction for a high volume food patty molding machine that effectively and inherently eliminates the problems and difficulties identified above.

Another object of the invention is to provide a new and improved mold cover construction for a food patty molding machine that permits the use of a relatively thin and readily replaceable fill plate as the element of the mold cover that engages the mold plate but that precludes the collection of food product between the fill plate and the main cover plate to an excessive extent sufficient to interfere with normal machine operation. A feature of the invention employed in achieving this objective comprises the provision of a relief channel, formed in one of the mating surfaces of the cover plate and the fill plate, encompassing but out of direct communication with the fill passage.

A further object of the invention is to provide a new and improved ready-release mounting for a fill plate and for a breather plate, in a high volume food patty molding machine, permitting rapid and convenient removal of both plates for cleaning, for replacement, and for other servicing purposes.

Thus, the invention relates to an improved mold cover for a food patty molding machine of the kind comprising a mold base, a mold cover, a mold plate including at least one mold cavity aperture disposed between the mold base and the mold cover, a cyclic mold plate drive for moving the mold plate between a fill position in which the mold cavity is closed by the base and the mold cover and a discharge position in which the mold cavity is exposed for discharge of a patty therefrom, and a food pump for pumping food product under pressure into the mold cavity whenever the mold plate is in its fill position. The improved mold cover of the invention comprises a cover plate, affixed to the food pump, having a pump outlet aperture therethrough, and a fill plate having a fill aperture therethrough. Mounting means are provided for removably mounting the fill plate on the cover plate, in close surface-mating engagement with the cover plate and in sliding surface-mating engagement with the mold plate, and with the pump outlet and fill apertures aligned to provide a continuous fill passage for food product from the pump into the mold cavity. A relief channel, in one of the mating surfaces of the cover and fill plates, adjacent to the fill passage but out of direct communication with both the fill passage and the mold cavities, receives excess food product forced between the cover plate and the fill plate, thereby precluding such excess food product from causing the fill plate to bind against the mold plate.

BRIEF DESCRIPTION OF THE DRAWINGS

FIG. 1 is a perspective view of a food patty molding machine in which the improved mold cover of the present invention may be incorporated;

FIG. 2 is a detail sectional side elevation view of a molding mechanism incorporating the improved mold cover of the invention, including a food pump, at the fill position for the molding mechanism;

FIG. 3 is a detail sectional view similar to FIG. 2 but showing the molding mechanism at its discharge position;

FIG. 4 is a plan view, on a reduced scale, of the mold plate for the molding mechanism of FIGS. 2 and 3;

FIG. 5 is a plan view of a fill plate constituting a part of the improved mold cover of the invention;

FIG. 5A is a detail sectional view, on an enlarged scale, taken along line 5A—5A in FIG. 5.

DESCRIPTION OF THE PREFERRED EMBODIMENTS

Figure 6:
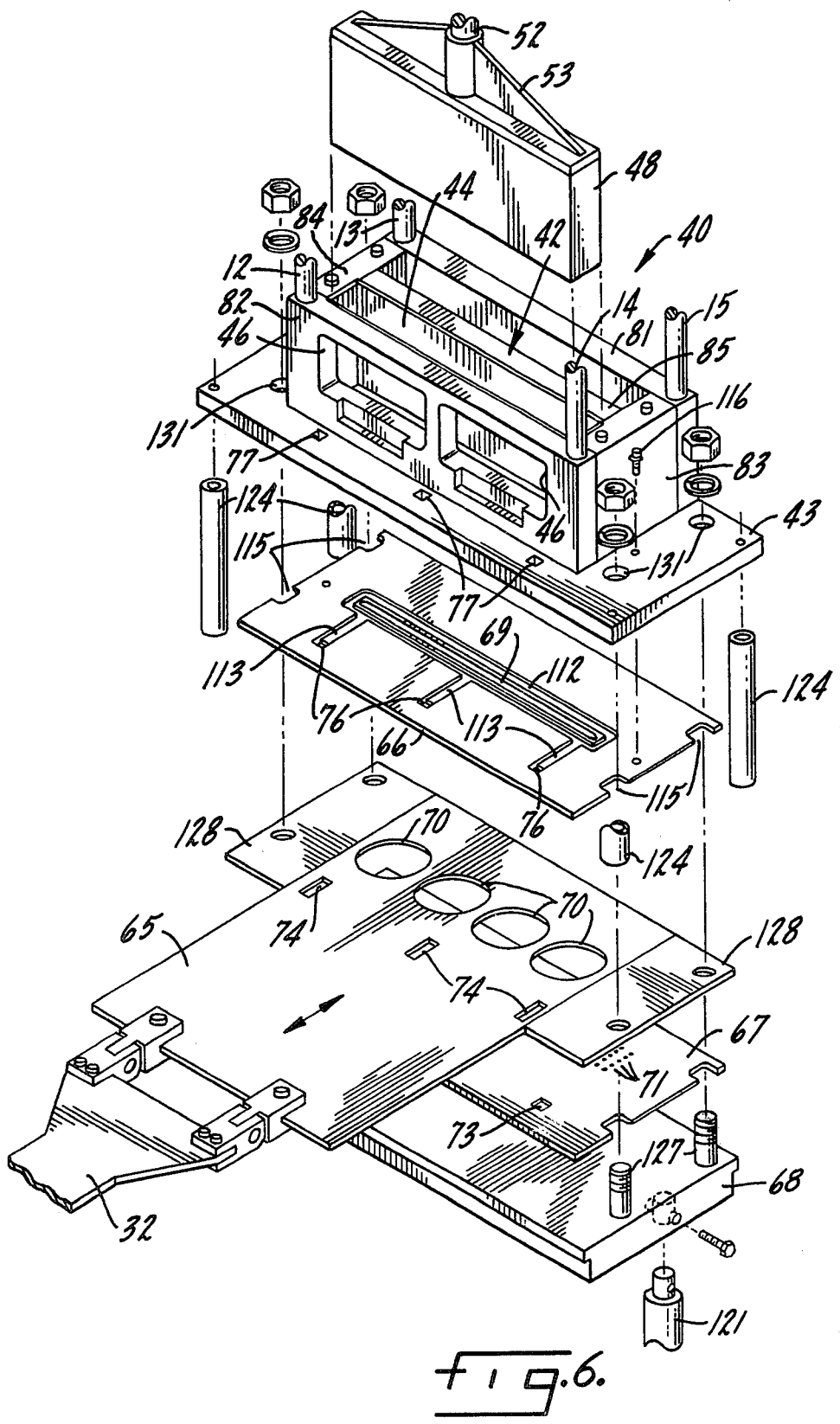
FIG. 6 is a partially exploded perspective view of the molding mechanism of FIGS. 2-5 that also illustrates the mounting means for the molding mechanism.

FIG. 1 affords a general illustration of a food patty molding machine 10 which may incorporate a mold cover constructed in accordance with the present invention. Molding machine 10, which generally corresponds to the machine of the aforementioned G. Sandberg et al application Ser. No. 623,986, comprises an enclosed machine base 11. Near the center of base 11 four fixed support rods 12, 13, 14 and 15 project upwardly to afford a vertical pump drive column frame capped by a plate 16. Two hopper support members 18 and 19 are affixed to and extend horizontally rearwardly from the vertical frame members 12 and 13, respectively. Hopper supports 18 and 19 terminate at a rear frame 21 that extends transversely of the rear of the machine.

A meat hopper 22 having an outwardly flared upper section 23 is mounted on support members 18 and 19, by a plurality of releasable clamps 24. Hopper 23 has a separately removable bottom 25 which slopes downwardly toward the front of machine 10, terminating adjacent the vertical column members 12 and 13. The left-hand end of the hopper bottom 25 is held in place below the main hopper body 22 by releasable clamps 26. The right-hand end of the hopper bottom 25 is held in place by a pair of cam retainers 27. Only one clamp 26 and one cam retainer 27 are shown in FIG. 1 but a corresponding construction is employed at the opposite side of machine 10.

The left-hand portion of machine base 11 (FIG. 1), to which access is provided by a door 31, houses a mold plate drive that is connected to a horizontally slidable mold plate yoke 32. Another door 33 in base 11 provides access to a hydraulic power unit for a food pump; the food pump itself is located in a housing 38 at the base of the vertical column afforded by frame members 12-15. A hydraulic motor (not shown) for driving the food pump is located in a housing 56 supported on plate 16. An electrical control system for patty molding machine 10 is located in the front portion of base 11, covered by a door 34. A paper interleaving mechanism 35 is mounted on the upper forward portion of base 11. Interleaving device 35 is preferably of the kind described in U.S. Pat. No. 3,952,478 to Richards et al, issued Apr. 27, 1976. A takeaway conveyor 36 extends outwardly of the right-hand end of machine 10.

As shown in FIGS. 2, 3 and 6, the food pump 40 for molding machine 10 comprises a pump housing 42; housing 42 extends transversely of machine 10 and is closed at the bottom by a cover plate 43. Pump housing 42 includes two side walls 81 and 82, two end walls 83 and 84, and a central partition wall 85. Walls 82-85 enclose a tall, narrow, elongated pump chamber 44 (FIGS. 2,3, and 6). Pump chamber 44 has an elongated outlet port or aperture 45 that extends longitudinally for the entire length of the pump chamber (see FIG. 4), the outlet aperture comprising a slot in the cover plate 43 (FIGS. 2,3) that forms the bottom of the pump chamber. Two access ports 46 are formed in side wall 82 of pump housing 42. Access ports 46 preferably have a height that is substantially greater than the width W of pump chamber 44 and extend for virtually the entire length L of the chamber (FIGS. 4 and 6).

Pump 40 further comprises a plunger 48 which projects into pump chamber 44 through a plunger opening 49 at the top of the chamber. The external dimensions of plunger 48 conform closely to the internal dimensions of chamber 44, except that the plunger height is preferably somewhat greater than the chamber height H. The pump drive may comprise a piston rod 52 which extends downwardly through plate 16 (FIG. 1) and is connected to plunger 48 by a connecting member 53 (FIGS. 1-3).

The food product supply means of molding machine 10, including hopper 22, maintains a supply of food product 61 in a position that completely covers the pump access ports 46 and precludes exposure of the access ports to the atmosphere. In addition to hopper 22, this food product supply means may comprise a conveyor that extends along the bottom 25 of hopper 22, which is inclined downwardly toward access ports 46. In the illustrated construction, the supply conveyor includes a plurality of feed screws 62, each of which terminates a substantial distance S from the access ports 46 (FIGS. 2,3). A belt or other supply conveyor can be utilized if desired.

A mold plate 65 is mounted below pump 40, as shown in FIGS. 2 and 3. Mold plate 65, which includes a plurality of mold cavities 70, is disposed between a fill plate 66 and a breather plate 67 that is mounted on a mold base plate 68 (FIGS. 2 and 3). Fill plate 65 includes an elongated fill aperture 69 that is aligned with and constitutes a continuation of the outlet aperture 45 for pump 40. Apertures 45 and 69 conjointly define a continuous fill passage for food product from chamber 44 of pump 40 to the mold cavities 70 of mold plate 65. A multiplicity of minute air outlet apertures 71 are formed in breather plate 67, in the part of the breather plate adjacent the fill passage 45,69. An air passage 72 connects apertures 71 to three vent apertures 73 in breather plate 67; only one of the apertures 73 is shown. The vent apertures 73 are aligned with corresponding apertures 74 in mold plate 65 when the mold plate is in its "fill" position as illustrated in FIG. 2. Corresponding aligned vent apertures 76 and 77 are provided in fill plate 66 and in cover plate 43, respectively, with each of the vent passages 77 in plate 43 being connected to a tube 78 that opens into the bottom 25 of hopper 22.

In the general operation of molding machine 10, a supply of the food product from which patties are to be molded is loaded into hopper 22 through the open top of the hopper. The food supply conveyor, in this instance feed screws 62, assures movement of the food supply down the sloping bottom of the supply hopper to a position at which the food product completely blocks the access ports 46 to food pump 40 (FIGS. 2 and 3) from the atmosphere.

When food patties are being molded, mold plate 65 is continuously driven through a reciprocating cycle. This cycle starts with the mold plate pulled to the left to the position shown in FIG. 2. This is the fill position for the mold plate, with all of the mold plate cavities 70 aligned with the fill passage 45,69 from food pump 40. In this position, plunger 48 forces food product out of the lower portion of chamber 44 through passage 45,69 and into mold cavities 70. The fill time for the mold cavities is usually very short, of the order of 0.2 second or less.

As food product is pumped into mold cavities 70, it displaces the air in the mold cavities. The air is forced outwardly through the breather holes 71 and the passageway 72 in plate 67, escaping through the passageway 73–77 into the bottom of hopper 22. Any food particles small enough to pass through the breather apertures 71 follow this same path back into the food product hopper.

From the fill position shown in FIG. 2, which corresponds to the position shown in solid lines in FIG. 4, mold plate 65 is driven to the right, between guide plates 66 and 67, moving the mold cavities 70 away from communication with the fill passage 45,69 from food pump 40. The initial movement of mold plate 65 preferably exhibits a gradual acceleration, with the mold plate speed increasing and then gradually slowing down until the mold plate reaches a discharge position with each of the mold cavities 70 aligned with one of a series of knock-out cups 92 (FIG. 3). Gradual acceleration and deceleration of the mold plate is quite desirable in minimizing wear and maintenance on the mold plate and mold plate drive. Mold plate 65 usually remains in the discharge position for only a short discharge dwell interval, of the order of 0.15 second or less.

While mold plate 65 remains in its discharge position, a knock-out drive (not shown) moves the knock-out cups 92 downwardly to drive the molded food patties from the mold cavities 70. Before the downward movement of the knock-out cups, sheet applicator 35 (FIG. 1) positions a paper or like separator sheet 89 below each patty on a shuttle frame 88 (FIG. 3). Consequently, as each knock-out cup 92 drives a molded food patty downwardly from one cavity 70 in mold plate 65, the food patty engages sheet 89 and the food patty and sheet fall together onto a stack on conveyor 36 (see FIG. 1).

The cyclic movement of mold plate 65 resumes with the mold plate moving inwardly toward food pump 40, immediately following the knock-out dwell interval at the discharge position of FIG. 3. The inward movement of mold plate 65 again preferably exhibits a gradual acceleration and a subsequent gradual deceleration.

If plunger 48 of food pump 40 has moved down to a critical level 95 (FIG. 2) in filling mold cavities 70, an intake stroke for plunger 48 is initiated to replenish the supply of food product in chamber 44. The pump intake stroke is completed during the time interval in which mold plate 65 is displaced from food pump 40 far enough so that mold cavities 70 are out of communication with the outlet passage 45,69. That is, the upward movement of plunger 48 is initiated after an appreciable outward movement of the mold plate has been effected, so that the food patties formed in cavities 70 will be molded under controlled pressure. The pump plunger drive that raises plunger 48 is preferably constructed to provide a very rapid upward movement of the plunger; in molding machine 10, the actual rate of movement for plunger 48 may be approximately 200 feet per minute. As a consequence, and because access ports 46 are blocked entirely by the food product supply 61, a limited vacuum is developed in the lower part 96 of chamber 44, drawing the viscous, poorly flowing food product 61 inwardly of pump chamber 44 as indicated by outline 61A in FIG. 3, in which plunger 48 is shown at the end of its upward movement. Because of the poor flowing characteristics of the food product 61, access ports 46 should afford a large area so that an adequate quantity of food product will be drawn into chamber 44.

From the up-ready position of FIG. 3, plunger 48 is subsequently driven back downwardly through chamber 44. This movement is initiated before mold plate 65 reaches its discharge dwell position in order to allow ample time for the plunger to move back down to an effective pressure position. The downward movement of plunger 48 is substantially slower than its upward movement, particularly when plunger 48 encounters the food product 61A that has been drawn into pump chamber 44. Later in the mold plate-pump cycle, the downward movement of plunger 48 places the food product 61A under substantial pressure, ready for filling mold cavities 70.

The pressure subchamber 96 constituting the lower part of pump chamber 44 may have a volume substantially greater than the total volume of the mold cavities 70. Thus, in the next mold cycle, after mold cavities 70 have been filled and mold plate 65 is moving outwardly towards its discharge position, there may be no need to replenish the supply of food product in pump chamber 44. Under these circumstances, plunger 48 remains in the pressure position range, between the position shown in solid lines and the limit position 95 in FIG. 2, without withdrawal to open access ports 46.

Because fill passage 45,69 is of minimal length and connects pump chamber 44 directly to mold cavities 70, the operating pressures required for pump 40 are maintained at a minimum. Nevertheless, in a typical high volume machine, operating at a mold plate frequency of 60 cycles per minute, the overall pump pressure may be of the order of 50 to 100 pounds per square inch for hamburger and other similar food products.

As with any food processing machine, molding machine 10 requires cleaning at frequent intervals. To allow access to pump chamber 44, plunger 48 may be raised to a cleaning position as generally indicated by line 48A in FIG. 3. When plunger 48 is in its cleaning position 48A, there is ready access permitting thorough flushing of both the plunger and the interior of pump 40.

During the mold filling portion of the operating cycle for machine 10, with the food product in passage 45,69 under substantial pressure as noted above, some of the food product may be forced into the interface 111 between the main cover plate 43 and fill plate 66. With continuing operation, and additional forcing of food product into the juncture between the cover plate and the fill plate, fill plate 66 may be deflected downwardly to an extent sufficient to close the very small running clearance between fill plate 66 and mold plate 65. This causes a braking action on mold plate 65, overloading the drive for the mold plate and materially increasing normal wear at the mating surfaces between mold plate 65 and fill plate 66. As noted above, this braking and binding action is highly undesirable and quite unacceptable in a high volume patty molding machine.

To control the amount of product forced between plates 43 and 66, and to eliminate the braking and binding action described above, a pressure relief channel 112 is formed in the upper surface of fill plate 66, the surface that mates with the lower surface of cover plate 43. Preferably, as shown in FIG. 5, the pressure relief channel 12 extends entirely around the fill passage 45,69. However, relief channel 112 is not in direct communication with the fill passage, nor is channel 112 in communication with any of the mold cavities 70. However, one side of channel 112 is connected, by three supplemental extension channels 113, to the vent opening 76 in plate 66 that is a part of the vent passage leading back to the bottom 25 of supply hopper 22. Thus, relief channels 112 and 113 collect any excess of food product forced between cover plate 43 and fill plate 66 and return the excess to food hopper 22, thereby precluding an excessive accumulation of food product between plates 43 and 66 that could otherwise bring about a deflection of plate 66 sufficient to cause binding or braking of mold plate 65.

There are several circumstances requiring removal of fill plate 66 from the main cover plate 43. As a general rule, the size of the fill slot 69 in fill plate 66 should be large for large volume patties, generally equal to the full width of the slot 45 in cover plate 43. However, a narrower slot 69 is desirable for smaller volume patties. The effective orifice width for the fill passage, determined by the width of slot 69, should be selected so that the product velocity, during the filling cycle, is high enough to produce a well-knit patty, yet not so restrictive as to require excessive pressure from pump 40. For a mold plate 65 having an effective length L (FIG. 4) of about 19 inches, with the particular pump described and shown, and an outlet slot 45 of 0.675 inch width, the preferred widths for fill slot 69 are as follows:

| Total Cavity Volume (4 Patties) | Fill Aperture Width |
|---|---|
| 6.4 to 14 ounces | .375 inch |
| 16 to 26 ounces | .5 inch |
| 28 ounces up | .675 inch |

However, other fill slot widths may prove preferable, depending on the pump pressure and other pump and mold parameters.

In addition, as in any food processing machine, molding machine 10 requires thorough cleaning at frequent intervals. This entails cleaning out any food product accumulation from relief channels 112 and 113 of plate 66 and from air channels 72 in breather plate 67. Thus, it is highly important that cover plate 66 and breather plate 67 be readily removable from the molding mechanism to facilitate a changeover of patty sizes and also to facilitate cleaning and other servicing of the molding machine.

As shown in FIG. 6, mold base plate 68 is supported upon two shafts 121 extending upwardly through hubs 122 mounted on a plate 123 that is a part of machine base 11. Shafts 121 are movable upwardly and downwardly by means of a worm gear mechanism (not shown) operated by a handwheel 103 (see FIG. 1). Breather plate 67 is secured to the upper surface of base plate 68. Cover plate 43 and pump 40, except for plunger 48, on the other hand, are supported on four posts 124 fixedly mounted on plate 123 on base 11. Fill plate 66 is secured to the lower surface of cover plate 43 by two cap screws 116 (FIG. 6) and has four edge notches 115 that engage two large double-end bolts 127 each having one end threaded into plate 68 and the other end projecting through an alignment aperture 131 in cover plate 43 to receive a retaining nut. The central portion of each bolt 127 constitutes a guide rod seated in one of the notches 115. The side edges of plates 66 and 67, which serve as wear and guide plates for mold plate 65, are bevelled as indicated at 126 in FIG. 5A for plate 66. Bolts 127 clamp the mold assembly comprising plates 43 and 66–68 together, with spacers 128 at the sides assuring proper clearance for mold plate 65 between fill plate 66 and breather plate 67. Rods 12–15 are seated in sockets in the top of pump housing plates 81 and 82, and all of the pump housing members 81–85 are secured to cover plate 43 and to each other by bolts or like fasteners.

When it is desired to change mold plate 65, to change fill plate 66, to change breather plate 67, or to clean these members of the molding mechanism, bolts 127 are removed and hand wheel 103 is employed to lower the two support shafts 121 upon which base plate 68 is mounted. Breather plate 67 and spacers 128 move downwardly with base plate 68. It is then a relatively simple matter to disconnect mold plate 65 from its drive yoke 32 (FIG. 1) and remove the mold plate to clean it or replace it with another mold plate having mold cavities of a desired different size or shape. To remove fill plate 66, cap screws 116 are removed, releasing fill plate 66 from cover plate 43. The fill plate can then be tilted, allowing rapid and convenient removal from the mold assembly. Tilting is facilitated by the bevel 126 on each side of plate 66. Breather plate 67 can be readily removed from the molding mechanism in similar manner.

Thus, with the illustrated mounting arrangement, it is possible to remove mold plate 65, fill plate 66, and breather plate 67 completely from the molding mechanism in a matter of a few minutes, whether for cleaning or replacement purposes. Fill plate 66 and breather plate 67 are each relatively inexpensive and light in weight, as compared with the main cover plate 43 and the main base plate 68. Accordingly, no undue economic burden is imposed on those installations where it is desirable to maintain a stock of several fill plates to meet the requirements of mold plates of varying volumes for different patty products, and spare fill plates and breather plates can be kept on hand to meet any operating exigencies. For mold plates of varying thickness, spacers 128 of correspondingly different thickness are employed.

In the illustrated embodiment of the invention, the mold cover comprising plates 43 and 66 is positioned above mold plate 65, whereas the mold base, plates 67 and 68, is located below the mold plate. These positions can be reversed in machines where it is desired to feed the mold plate from below, as in Richards U.S. Pat. No. 3,887,964 issued June 10, 1975. Furthermore, the mold plate could be oriented for vertical rather than horizontal movement, with the mold cover and base located on opposite sides of the mold plate and also vertically oriented. Moreover, in some installations it may be desirable to locate the air vents such as vents 71 on the same side of the mold plate as the fill passage so that one of the wear and guide plates 66,67 becomes both a breather plate and a fill plate with a pressure relief channel. Of course, in any of these arrangements, the relief channels 112,113 can be formed partly or entirely in the surface of cover plate 43 instead of fill plate 66, with the same operating effect as for the illustrated construction.

I claim:

1. In a food patty molding machine of the kind comprising a mold base, a mold cover, a mold plate including at least one mold cavity aperture disposed between the base and the mold cover, a cyclic mold plate drive for moving the mold plate between a fill position in which the mold cavity is closed by the mold base and the mold cover and a discharge position in which the mold cavity is exposed for discharge of a patty therefrom, and a food pump for pumping food product under pressure into the mold cavity when the mold plate is in its fill position, an improved mold cover comprising:
   a cover plate, affixed to the food pump, having a pump outlet aperture therethrough;
   a fill plate having a fill aperture therethrough;
   mounting and aligning means for removably mounting the fill plate on the cover plate, in close surface-mating engagement with the cover plate and in sliding surface-mating engagement with the mold plate, and with the pump outlet and fill apertures aligned to provide a fill passage for food product from the pump into the mold cavity;
   and a relief channel, in one of the mating surfaces of the cover and fill plates, adjacent to but out of direct communication with the fill passage, for receiving excess food product forced between the cover plate and the fill plate to thereby preclude such excess food product from causing the fill plate to bind against the mold plate.

2. A mold cover for a food patty molding machine, according to claim 1, in which the relief channel extends entirely around the fill passage in close proximity thereto.

3. A mold cover for a food patty molding machine, according to claim 1, and further comprising at least one relief channel extension, connecting the relief channel to a point at approximately atmospheric pressure.

4. A mold cover for a food patty molding machine, according to claim 3, for use in a machine comprising a mold base that includes a multiplicity of breather apertures connected to a vent passage leading to a food product supply for the pump, in which the relief channel extension is connected to such vent passage.

5. A mold cover for a food patty molding machine, according to claim 1, in which the mounting and aligning means comprises a plurality of guide rods engaging alignment apertures at opposite sides of both the cover plate and the fill plate, and in which the alignment apertures in the fill plate constitute open-sided edge notches permitting tilting of the fill plate relative to the guide rods and cover plate for removal and replacement of the fill plate.

6. A mold cover for a food patty molding machine, according to claim 5, in which the opposite sides of the fill plate engaged by the guide rods are bevelled to facilitate tilting of the fill plate for removal or replacement.

7. A mold cover for a food patty molding machine, according to claim 5, in which the mounting and alignment means further comprises a pair of removable fasteners securing the fill plate to the cover plate.

8. A food patty molding system including a molding machine and auxiliary apparatus for converting the molding machine to produce patties of varying sizes, including a food patty molding machine comprising:
   a food pump for pumping food product under substantial pressure;
   a mold cover including a cover plate affixed to the food pump and having a pump outlet aperture therethrough, a first fill plate having a fill aperture of given size leading to a flat mold closure surface, mounting and aligning means for removably mounting the fill plate on the cover plate with the pump outlet and fill apertures aligned as a continuous food product fill passage, and a relief channel in one of the mating surfaces of the cover and fill plates in close proximity to but out of direct communication with the fill passage, for receiving excess food product forced between the cover plate and the fill plate to preclude excessive deflection of the fill plate away from the cover plate;
   a mold base having a flat mold closure surface, mounted in spaced aligned relation to the mold cover fill plate to afford a mold plate space between the two mold closure surfaces;
   a first mold plate, having a plurality of mold cavity apertures of a given total cavity volume, removably disposed within the mold plate space;
   and a cyclic mold plate drive for moving the mold plate between a fill position in which the mold cavities are aligned with the fill aperture to receive food product under pressure from the food pump, and a discharge position in which the mold cavities are exposed for discharge of food patties therefrom;
   the system further comprising:
   at least one additional mold plate constituting a replacement for the first mold plate and having a plurality of mold cavity apertures having a total cavity volume smaller than the cavity volume for the first mold plate;
   and at least one additional fill plate, constituting a replacement for the first fill plate, for use with the additional mold plate, the additional fill plate having a smaller fill aperture than the fill aperture of the first fill plate.

9. A food patty molding system according to claim 8, in which the mold base comprises a base plate and a breather plate removably mounted on the base plate between the base plate and the mold plate, the breather plate having a multiplicity of breather apertures connected to a vent passage leading to a point at approximately atmospheric pressure, and in which the relief channel is connected to the vent passage.

10. A food patty molding system according to claim 9, in which the mold base and mold cover are mounted in a mold assembly by a plurality of mounting bolts interconnecting opposite sides of the mold plate and the cover plate, each bolt including a central guide rod portion, and in which mounting and aligning means for the fill plate comprises a corresponding plurality of open-sided edge notches engaging the guide rod portions of the mounting bolts and permitting tilting of the fill plate for removal or replacement.

* * * * *